April 3, 1962   J. WERNER   3,028,194
ROOFS EACH HAVING A FIXED ROOF PART AND A FOLDING ROOF PART
Filed Oct. 28, 1959
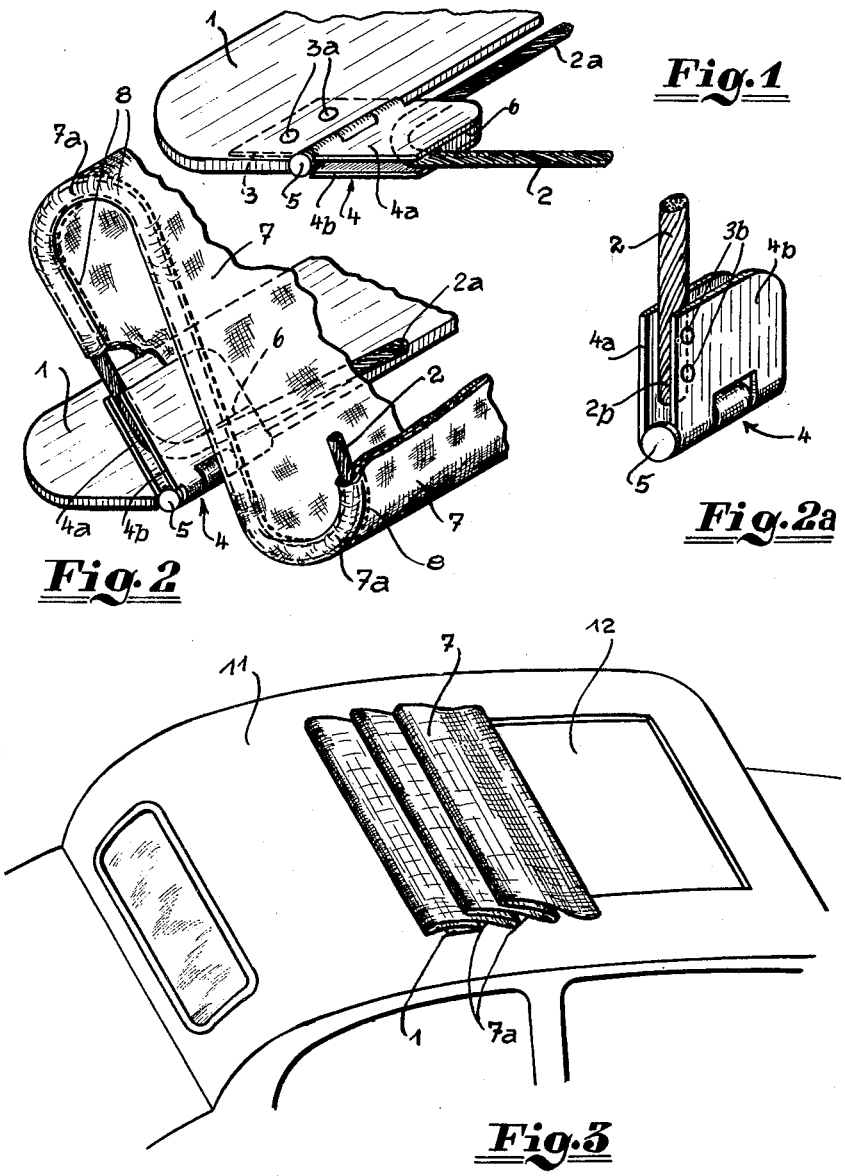

_United States Patent Office_

3,028,194
Patented Apr. 3, 1962

3,028,194
ROOFS EACH HAVING A FIXED ROOF PART
AND A FOLDING ROOF PART
Johannes Werner, Offenbach, Germany, assignor to H. T. Golde G.m.b.H. & Co. K.G., Frankfurt, Germany
Filed Oct. 28, 1959, Ser. No. 849,353
Claims priority, application Germany Nov. 5, 1958
8 Claims. (Cl. 296—137)

This invention relates to folding roofs each having fixed and folding roof parts.

In a folding roof of a motor vehicle the edges of the folding roof part are usually tensioned in such a manner that they bear tightly against the fixed roof part. Strips of textile material or tensioning cables are sewn in for this purpose. Metal tensioning cables are preferred since they can be housed in respective tubes formed by hemming the edges of the folding roof part. These metal cables lead from the forward cap (with reference to the direction of travel of the motor vehicle) of the folding roof part to the rear of the roof aperture where they are attached, for example, to a mounting bar which forms part of the fixed roof part. To permit re-tensioning, the rear cable ends are often releasably secured to the bar, for example by means of clamping screws.

When the folding roof part or top is fully opened, the rear cable end portions in these roof structures are bent over and, behind the last fold, are in the form of a small-radius curve, since the rearmost fold of the folding roof part lies on the fixed part of the roof. This bending of the rear cable end portions causes the cables to be subjected to considerable stress at these points and the individual strands of the cable may be broken in the course of time, with the possibility of consequent damage to the fabric of the folding roof part.

According to the present invention, there is provided a roof comprising a fixed roof part, portions of said fixed roof part defining an aperture therein, two guide means which are included in said fixed roof part and which extend in the same direction one as the other and on respective opposite sides of said aperture, a foldable roof part guidable, by said guide means, between a closed position, in which said foldable roof part closes said aperture and is roughtly flat, and an open position, in which it is folded up near one of those sides of said aperture other than said opposite sides so that the folds thereof extend transversely to said direction, a cable means connected at locations along the length thereof to said foldable roof part, and, when said foldable roof part is in said closed position, extending generally in said direction, and hinge means, which has its hinging axis substantially horizontal and transverse to said direction and which is attached, on the one hand, to that end portion of said cable means nearer said one of those sides, and, on the other hand, to portions of said fixed roof part near said one of those sides.

In order that the invention may be clearly understood and readily carried into effect, reference will now be made, by way of example, to the accompanying drawings, in which:

FIGURE 1 is a perspective view of a part of a vehicle roof, the members being in a first position, FIGURE 2 is a view corresponding to FIGURE 1, but with the members being in a second position, and a further member being shown, and FIGURE 2a is a perspective view of a part of a modified version of the roof shown in FIGURE 1, and FIGURE 3 is a perspective view of the vehicle roof or of the modified version thereof.

Referring to the drawings, the vehicle roof includes a fixed roof part 11 having formed therein an aperture 12, there being guide portions of the part 11 extending in the longitudinal direction of the vehicle roof and being situated adjacent the opposite sides of the aperture extending along the roof. The guide portions serve to guide a folding roof part or top 7, formed of flexible material, and movable between a closed position in which the part 7 closes the aperture 12 and is roughly flat, and an open position in which it is folded up near the rearmost side of the aperture 12 (with reference to the traveling direction of the motor vehicle) so that the folds of the part 7 extend transversely to the roof. Two steel cables, of which one is shown and referenced 2, are connected, along the lengths thereof, to the part 7 by being housed in respective channels, such as the tube 8, formed by hemming the respective edges 7a of the part 7 that one adjacent the guide portions of the fixed roof part. The cables serve to tension the edges of the folding part against the fixed roof part and, when said folding roof part is in the closed position, they extend generally in the longitudinal direction of the roof. Two hinges are also provided that have their respective hinging axes transverse to said direction and to the roof aperture, and are attached, on the one hand, to the rearmost end portions of the respective cables and, on the other hand, to a mounting bar or member 1 forming part of the fixed roof part near that rearmost side, so that the hinges follow the movements of the cables by moving about their axes. The ends 2a of the cables 2 can, when necessary, cooperate with suitable means (not shown) for re-tensioning the cables. Since both hinges are identical, only the one shown need be described in detail. Referring to FIGURES 1 and 2, the hinge includes a hinge part 3 fixed to the member 1, for example by means of screws or rivets 3a, and a hinge part 4 attached to the rear end portion of the respective cable; the part 4 is connected to the part 3 by means of a hinge pin 5.

The hinge part 4 consists of two plates 4a and 4b between which is inserted a piece 6 having a curved guide edge so shaped that the rear end portion of the cable 2 is formed around it with a roughly quarter-circle curve of sufficiently large radius to avoid breakage of the strands constituting the cable.

FIGURE 2 shows the folding roof part or top in a folded position, the folds being illustrated schematically in the fabric 7 of the folding roof part.

Referring to FIGURE 2a, the cable 2 need not be curved through 90° but can terminate within the hinge part 4, as shown and the cable end portion 2b can be fixed therein at 3b in an appropriate manner, for example by clamping screws or welding. This simple version is particularly advantageous when no retightening of the cables is necessary.

I claim:
1. A folding roof structure for vehicles having an apertured roof, comprising: a folding top of flexible material adapted to cover said aperture and attached along a first side to one portion of said roof, said top being displaceable from a substantially planar closed position to a folded open position, a second side of said top opposite said first side being adjacent said one portion of the roof when said top is open, and adjacent a portion of said aperture opposite said one portion of the roof when said top is closed; cable means attached along the remaining sides of the top and forming a unit with the latter for displacement and folding therewith, whereby the cable means is angularly bent in the region of said remaining sides when the top is folded into its open position; and hinge means interconnecting said cable means and said roof, said hinge means including a first portion secured to said one portion of the roof and a second portion pivotally connected to said first portion, said second portion comprising two spaced-apart elements adapted to hold therebetween a portion of said cable means close to its end.

2. A folding roof structure according to claim 1, further comprising a detachable mounting member forming part of said roof in the region of said one portion of the roof, said hinge means being connected to said mounting member by means of said first portion of the hinge means.

3. A folding roof structure according to claim 1, said second portion of the hinge means further comprising an arcuate guide element interposed between said two elements for positively engaging an end portion of said cable means; said cable means describing around said guide element substantially a quarter circle whereby said end portion bcomes substantially perpendicular to the direction of said remaining sides of the folding top.

4. A folding roof structure according to claim 2, wherein said second side of the folding top lies, when the same is closed, substantially perpendicular to and towards the direction of forward travel of the vehicle, while said first side of the top and said one portion of the roof are located away from said direction; wherein said cable means has a cable coextensive with each of said remaining sides of the folding top; and wherein said hinge means are provided at both ends of said mounting member.

5. A folding roof structure for vehicles having an aperture in the roof, comprising: a folding top of flexible material adapted to cover said aperture and attached along a first side to a first portion of the roof; said top being displaceable from a substantially planar aperture covering position to a folded open position, a second side of said top opposite said first side being substantially adjacent said first portion of the roof when said top is in its open position, and adjacent a portion of said aperture opposite said first portion of the roof when said top is in its planar position; cable means attached along the remaining sides of said top and forming a unit with the latter for displacement and folding therewith, so that said cable means is angularly bent in the region of said remaining sides when said top is folded into its open position; and hinge means interposed between said roof and said cable means, said hinge means including a first portion secured to said first portion of the roof and a second portion pivotally attached to said first portion, said second portion comprising two spaced-apart elements adapted to hold therebetween a portion of said cable means close to its end, and an arcuate guide element interposed between said two elements for positively engaging an end portion of said cable means; said cable means describing around said guide element substantially a quarter circle whereby said end portion becomes substantially perpendicular to the direction of said remaining sides of the folding top.

6. A folding roof structure according to claim 5, further comprising a detachable mounting member forming part of said roof in the region of said first portion of the roof, said first portion of the hinge means being connected to said mounting member.

7. A folding roof structure according to claim 6, wherein said second side of the folding top lies, when the same is in its planar position, substantially perpendicular to and towards the direction of forward travel of the vehicle, while said first side of the top and said first portion of the roof are located away from said direction; wherein said cable means has a cable coextensive with each of said remaining sides of the folding top; and wherein said hinge means are provided at both ends of said mounting member.

8. A folding roof structure according to claim 5, wherein said two elements of the second hinge portion are adjustable in their spatial relationship, further comprising means for re-tensioning said portion of the cable means engaged by said two elements.

References Cited in the file of this patent
UNITED STATES PATENTS

| | | |
|---|---|---|
| 929,615 | Madden | July 27, 1909 |
| 1,413,424 | Peczenik | Apr. 18, 1922 |

FOREIGN PATENTS

| | | |
|---|---|---|
| 650,528 | France | Jan. 10, 1929 |
| 751,374 | France | Sept. 2, 1933 |
| 340,183 | Great Britain | Dec. 24, 1930 |